US012685981B2

(12) United States Patent
Chen et al.

(10) Patent No.: US 12,685,981 B2
(45) Date of Patent: *Jul. 21, 2026

(54) METHOD AND REACTOR FOR CONVERSION OF HYDROCARBONS

(71) Applicant: SABIC Global Technologies B.V., Bergen op Zoom (NL)

(72) Inventors: Lei Chen, Houston, TX (US); Sreekanth Pannala, Houston, TX (US); David West, Houston, TX (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 650 days.

This patent is subject to a terminal disclaimer.

(21) Appl. No.: 18/004,020

(22) PCT Filed: Jul. 6, 2021

(86) PCT No.: PCT/US2021/040413
§ 371 (c)(1),
(2) Date: Dec. 30, 2022

(87) PCT Pub. No.: WO2022/010822
PCT Pub. Date: Jan. 13, 2022

(65) Prior Publication Data
US 2023/0256406 A1      Aug. 17, 2023

Related U.S. Application Data

(60) Provisional application No. 63/048,208, filed on Jul. 6, 2020.

(51) Int. Cl.
*B01J 4/00*          (2006.01)
*B01J 12/00*         (2006.01)
(Continued)

(52) U.S. Cl.
CPC ............. *B01J 4/005* (2013.01); *B01J 12/005* (2013.01); *B01J 19/2405* (2013.01);
(Continued)

(58) Field of Classification Search
CPC ...... B01J 4/005; B01J 12/005; B01J 19/2405; C10G 47/22
See application file for complete search history.

(56) References Cited

U.S. PATENT DOCUMENTS 2,823,243 A     2/1958  Robinson
3,438,741 A     4/1969  Boyd et al.
(Continued)

FOREIGN PATENT DOCUMENTS

CN      2237640 Y     10/1996
EP      0323297 A1     7/1989
(Continued)

OTHER PUBLICATIONS

Foreign communication from related application—International Search Report and Written Opinion dated Oct. 21, 2021 for application No. PCT/US2021/040413 filed Jul. 6, 2021, 22 pages.
(Continued)

*Primary Examiner* — Claire X Wang
*Assistant Examiner* — Alyssa Lee Kuykendall
(74) *Attorney, Agent, or Firm* — Fish & Richardson P.C.

(57)          ABSTRACT

A reactor and method for the conversion of hydrocarbon gases utilizes a reactor (12, 312, 412, 512, 612, 712) having a unique feed assembly with an original vortex combustion chamber (40, 340, 436, 536, 636, 736), a diverging conduit (48, 348, 448, 548, 648, 748), and a cylindrical reactor chamber (40, 340, 436, 536, 636, 736). This design creates a compact combustion zone and an inwardly swirling fluid flow pattern of the feed gases to form a swirling gas mixture that passes through a diverging conduit (48, 348, 448, 548,

(Continued)

648, 748). The feed streams can be introduced into the reactor at any angle (perpendicular, axial, or something between, or a combination of the above forms) with swirling flow components. This provides conditions suitable for efficient cracking of hydrocarbons, such as ethane, to form olefins.

20 Claims, 7 Drawing Sheets

(51) Int. Cl.
B01J 19/24 (2006.01)
C10G 47/22 (2006.01)

(52) U.S. Cl.
CPC .......... B01J 19/243 (2013.01); B01J 19/248 (2013.01); C10G 47/22 (2013.01); B01J 2204/002 (2013.01); B01J 2204/007 (2013.01); B01J 2219/00121 (2013.01); B01J 2219/185 (2013.01)

(56) References Cited

U.S. PATENT DOCUMENTS

| | | | |
|---|---|---|---|
| 3,498,753 | A | 3/1970 | Hokari et al. |
| 4,320,092 | A | 3/1982 | Kondo et al. |
| 4,400,180 | A | 8/1983 | Marion et al. |
| 5,789,644 | A | 8/1998 | Passler et al. |
| 11,020,719 | B2 | 6/2021 | Pannala et al. |
| 2006/0000395 | A1 | 1/2006 | Joshi et al. |
| 2008/0264310 | A1 * | 10/2008 | Jia ............................ F23C 9/003 |
| | | | 431/11 |
| 2010/0285413 | A1 | 11/2010 | Borissov |
| 2019/0127295 | A1 | 5/2019 | Pannala et al. |

FOREIGN PATENT DOCUMENTS

| | | | |
|---|---|---|---|
| EP | 0465157 A1 * | 7/1995 | |
| EP | 875719 | 11/1998 | |
| GB | 834419 A | 5/1960 | |
| GB | 840664 A | 7/1960 | |
| GB | 910623 A | 11/1962 | |
| GB | 1174870 A | 12/1969 | |
| GB | 2353802 B | 8/2002 | |
| WO | WO 2004035187 | 4/2004 | |
| WO | 2019173570 A1 | 9/2019 | |
| WO | WO-2020086681 A2 * | 4/2020 | ............ B01J 12/005 |

OTHER PUBLICATIONS

Foreign communication from related application—International Preliminary Report on Patentability dated Jan. 10, 2023 for application No. PCT/US2021/040413 filed Jul. 6, 2021, 11 pages.
Naumov et al., "Multi-cellular pattern of a two-fluid swirling flow in a closed cylinder", Journal of Physics: IOP Conference Series, vol. 1105, 012030, Nov. 2018, pp. 1-6, 6 pages.
Naumov et al., "Hysteresis in a swirling two-fluid flow", Journal of Physics: IOP Conference Series, vol. 899, 032015, Sep. 2017, pp. 1-6, 6 pages.
Shtern et al., "Effect of swirl decay on vortex breakdown in a confined steady axisymmetric flow", Physics of Fluids, vol. 24, 043601, Issue: 4, Apr. 23, 2012, 14 pages.
Shtern et al., "Hysteresis and precession of a swirling jet normal to a wall", Physical Review E, vol. 69, 016312, Issue: 1-2, Jan. 30, 2004, 11 pages.
Shtern et al., "Hysteresis in swirling jets", Journal of Fluid Mechanics, vol. 309, 1996, Feb. 25, 1996, pp. 1-44, 44 pages.
Shtern et al., "Hysteresis in a swirling jet as a model tornado", Physics of Fluids A: Fluid Dynamics, vol. 5, Issue 8 9, 1993, Sep. 1, 1993; pp. 2183-2195, 13 Pages.
CN office action issued on Apr. 14, 2025 for the patent Application No. 202180048126.4 dated May 1, 2023, 7 pages.

* cited by examiner

METHOD AND REACTOR FOR CONVERSION OF HYDROCARBONS

CROSS-REFERENCE TO RELATED APPLICATIONS

This application is a National Stage Application under 35 U.S.C. § 371 and claims the benefit of International Application No. PCT/US2021/040413, filed Jul. 6, 2021, which claims the benefit of priority to U.S. Application No. 63/048, 208, filed Jul. 6, 2020, the entirety of both of which are incorporated herein by reference.

TECHNICAL FIELD

The disclosure relates to conversion methods for converting a variety of hydrocarbons to produce more valuable products and the reactor designs for such conversion.

BACKGROUND

A single-stage combustion pyrolysis method to produce acetylene was developed by BASF, which is described in U.S. Pat. No. 5,789,644. This process has been commercialized at a 50 KTA scale using multiple reactors in Germany and the U.S. In this process, natural gas serves for the hydrocarbon feed and pure oxygen serves as the oxidant to generate heat, which is critical for acetylene production. The two streams are premixed in a diffuser, and the premixed fuel rich gas is burnt using a burner block through partial oxidation. A major disadvantage of such a design is the flashback risks of the premixed flame under various feedstock and operating conditions, as well as the plurality of burners used, which increases the total cost of operation, difficulties in heat control, and low carbon yield toward olefin product. Furthermore, while acetylene used to be the building block for chemicals, over the last six to seven decades olefins have become the building blocks of the chemical industries and there is a desire to directly produce olefins rather than the indirect hydrogenation route using acetylene.

Conventional steam crackers are the industry go-to reactors to break long-chain hydrocarbons and modify smaller alkanes (i.e., naphtha, butane, or ethane) into smaller molecules and olefins, such as ethylene and propylene. In such crackers, heavy gases such as naphtha, liquefied petroleum gas (LPG), propane, butane, and ethane are fed into a furnace with steam and converted into smaller olefins. Steam is added to the process to increase the selectivity to olefins with reasonable conversion. Typically, this process operates at high temperatures (i.e., from 750° C. to 900° C.) and have residence times of around 100 to 500 milliseconds. This process has been optimized over the last five decades but there are still significant disadvantages. These include heat losses and complexity associated with separate exothermic (combustion in the furnace) and endothermic steps (cracking in the process tubes). The presence of inert compounds in the combustion and process side also affects the overall efficiency. Metallurgical limitations of the reactors also limit the temperatures that can be used. Ideally, higher temperatures with shorter contact times result in better selectivity and conversion to smaller olefins. Plugging from coking also occurs in these conventional processes, which can increase the capital cost and operational expenses. There is also a lack of feedstock flexibility, as commercial crackers are typically optimized for only a certain type of feedstock.

One solution to these challenges is an ANJEVOC reactor system. The basic ANJEVOC (ANnular JEt VOrtex Chamber) system is disclosed in U.S. Pat. No. 11,020,719, which is incorporated by reference herein for all purposes. U.S. Pat. No. 11,020,719 describes a reactor system that can be used in the pyrolysis conversion of hydrocarbon gases. The ANJEVOC reactor may also be used for cracking, with a somewhat different configuration, referred to as "ANJE-VOC-C" the extra "C" for cracking. This cracking system is described in International Publication No. WO2020/086681A2, which is incorporated by reference herein for all purposes.

The disclosure addresses significant changes and improvements in the ANJEVOC-C system.

SUMMARY

The present disclosure includes an axial feed design. Such a design has many advantages, including making the swirling flow field between fuel/oxidizer streams be well organized, without undesired mixing, and no radial bleeding of $O_2$ into a light fuel stream. This results in less premixed risks, cooler reactor walls due to the cold crack gas inner-cooling, easy arrangement of a liquid fuel nozzle in the bottom centerline, lower pressure drop through the reactor, and a simplified axial feeding mechanical design.

In a preferred embodiment of a reactor system for the conversion of hydrocarbons, the reactor system comprises a reactor vessel having a reactor wall that defines a reaction chamber. The reactor system further comprises a reactor inlet assembly having a diverging conduit, as seen from the upstream to downstream direction, with a circumferential wall that surrounds a central longitudinal axis and extends from opposite upstream and downstream ends of the diverging conduit, the downstream end of the diverging conduit being in fluid communication with the reaction chamber of the reactor, and the upstream end of the diverging conduit forming an inlet of the reactor inlet assembly.

The reactor system further comprises a feed assembly in fluid communication with the inlet of the reactor inlet assembly, with the central axis passing through the feed assembly, the feed assembly comprising a downstream feed assembly wall that extends circumferentially around and joins the upstream end of the reactor inlet assembly. The feed assembly comprises an upstream feed assembly wall that is axially spaced upstream from the downstream feed assembly wall along the central axis, the downstream feed assembly wall and the upstream feed assembly wall together defining in part a mixing chamber for mixing two or more feed streams.

The feed assembly further comprises an upstream gas partition wall and a downstream gas partition wall that are each axially spaced between the downstream and upstream feed assembly walls and are axially spaced from one another. Each upstream gas partition wall and downstream gas partition wall having a central opening that surrounds the central axis of the diverging conduit. An upstream annular hydrocarbon feed inlet flow space is defined between the upstream feed assembly wall and the upstream partition wall. An annular steam inlet flow space is defined between the downstream feed assembly wall and the downstream gas partition wall. And an annular fuel gas inlet flow space is defined between the downstream gas partition wall and the upstream gas partition wall.

The annular fuel gas inlet flow space is further partitioned by a fuel gas partition wall. The fuel gas partition wall is axially spaced between the downstream gas partition wall and the upstream gas partition wall to define first and second annular fuel gas inlet flow spaces. The fuel gas partition wall has a central opening that surrounds the central axis of the diverging conduit. The periphery of the central opening of the fuel gas partition wall is spaced radially outward from the central openings of the upstream gas partition wall and the downstream gas partition wall, the area spaced radially inward from the central opening of the fuel gas partition wall between the upstream and downstream gas partition walls defining an annular combustion zone where heated combustion gases are formed.

The said annular inlet flow spaces cause introduced feeds to flow in an inwardly swirling fluid flow pattern within the flow spaces about the central axis of the diverging conduit. The area extending from the central openings of the upstream and downstream partition walls to the inlet of the reactor inlet assembly defines a mixing chamber of the feed assembly. The heated combustion gases from the fuel gas inlet flow space and hydrocarbon feed from the upstream hydrocarbon feed inlet flow space are discharged into the mixing chamber so that hydrocarbon feed and heated combustion gases are mixed together and form a swirling gas mixture within the mixing chamber. The swirling gas mixture passes through the diverging conduit to the reaction chamber. And finally, at least one of the inlet flow spaces causes its respective feed stream to enter the reactor in a direction that is not perpendicular to the central axis.

In another embodiment of the disclosure, the reactor system may have all the inlet flow spaces cause their respective feed streams to enter the reactor in a direction that is not perpendicular to the central axis.

In another embodiment of the disclosure, the reactor inlet assembly further comprises guide vanes, wherein the guide vanes provide selected azimuthal-to-radial velocity ratios of feed streams flowing into the mixing chamber, and further wherein the guide vanes may be movable to selected positions.

In another embodiment of the disclosure, one of the feed streams may comprise steam.

In another embodiment of the disclosure, there may be at least four feed streams, the streams comprising oxygen, methane, hydrogen, and one or more of C2, C3, C4, naphtha, or higher hydrocarbon feed.

In another embodiment of the disclosure, the oxygen, methane and hydrogen flow in axially to the central longitudinal axis, while the C2, C3, C4, naphtha flow, or higher hydrocarbon feed in perpendicularly.

In another embodiment of the disclosure, the oxygen, methane and hydrogen flow in perpendicularly to the central longitudinal axis, while the C2, C3, C4, naphtha, or higher hydrocarbon feed flows in axially.

In another embodiment of the disclosure, all the feed streams flow into the reactor axially to the central longitudinal axis.

In another embodiment of the disclosure, a feed stream coming in via a swirl atomizer is naphtha, crude oil or NGL in liquid phase.

In another embodiment of the disclosure, the remaining feed streams not entering through the swirl atomizer are methane, hydrogen, oxygen, and water or steam.

In another embodiment of the disclosure, all the remaining feed streams not entering through the swirl atomizer enter the reactor perpendicularly to the central longitudinal axis.

In another embodiment of the disclosure, one or more of the feed streams not entering the reactor through the swirl atomizer enter the reactor axially to the central longitudinal axis, and one or more of the remaining inlet streams enter the reactor perpendicularly.

In another embodiment of the disclosure, the selection and placement of the one or more flow inlet spaces allows one to control the relative location of the flame front.

In another embodiment of the disclosure, the selection and placement of the one or more flow inlet spaces allows one to control the placement of the portions of the feed streams that comprise cold feedstock relative to the hot combustion gases existing in the reactor, with regard to the outer wall.

In another embodiment of the disclosure, the cold feedstock first enters the reactor closest to the outer wall, and then moves radially inward to interact with the hot combustion gases.

In another embodiment of the disclosure, the cold feedstock enters the reactor at or near the center of the reactor and moves radially outward to interact with the hot combustion gases.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

In the present disclosure, a novel system is utilized that converts hydrocarbons to higher value products, such as olefins, by utilizing high centrifugal forces in a unique reactor configuration to create and control a reacting flow environment that maximizes the production of desirable olefins with very high productivity (cracking). This is achieved by utilizing annular highly swirled jets of feed gases where hydrogen (or other fuels such as natural gas) and oxygen gases are mainly used to generate the heat required for cracking of hydrocarbons. The cracking reactor used is similar to the pyrolysis reactor described in International Publication No. WO2020/086681A2, which is incorporated by reference herein for all purposes. International Publication No. WO2020/086681A2 describes a reactor that can be used in the pyrolysis cracking of hydrocarbon gases. This type of reactor may be referred to as an ANJE-VOC-C (ANnular JEt VOrtex Chamber—Cracking) reactor.

Figure 1:
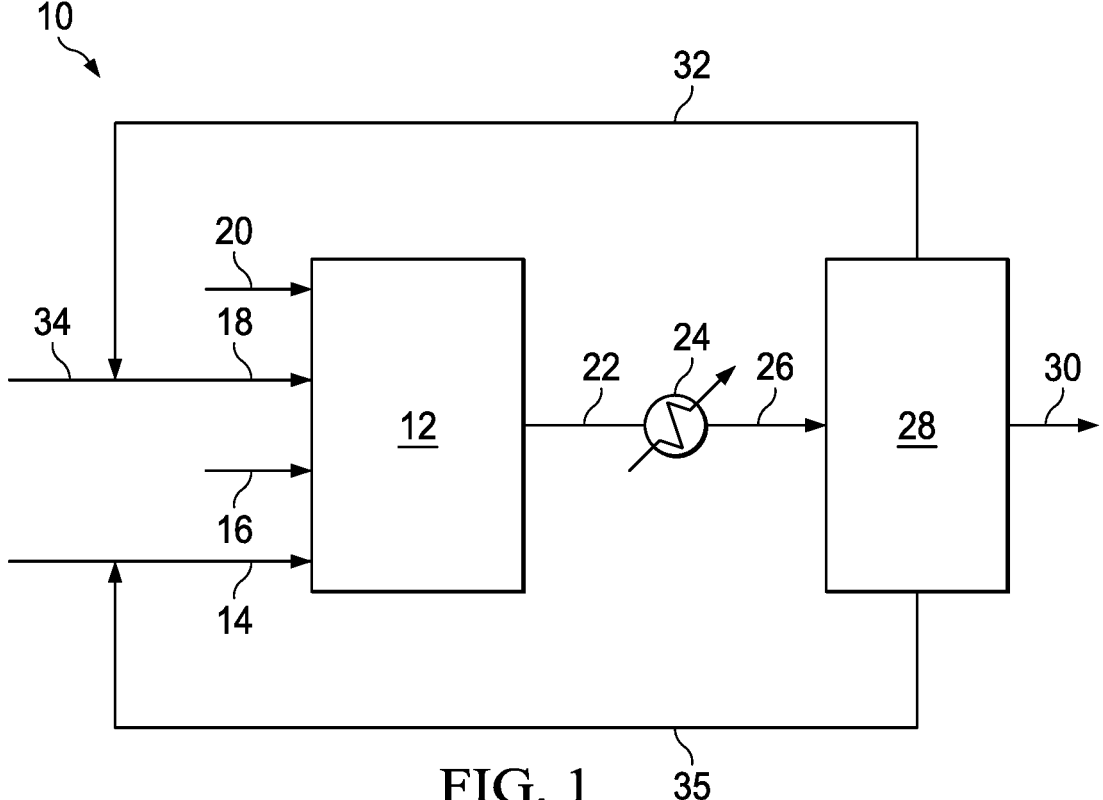
FIG. 1 is a process flow diagram of a cracking system for cracking of hydrocarbons into cracked hydrocarbon products in accordance with particular embodiments of the disclosure.

Referring to FIG. 1, a flow schematic of a hydrocarbon conversion system 10 is shown for the conversion of hydrocarbons to higher value products, such as olefins. The system 10 includes an ANJEVOC-C cracking reactor 12, which is described in more detail supra. A cracking feed 14 is fed to the reactor 12 as a separate stream. The cracking feed 14 can include hydrocarbons such as ethane, liquefied petroleum gas (LPG), butane, naphtha, natural gas, light gas oils, natural gas liquids (NGL) and/or heavy gas oils. The cracking feed stream 14 may be preheated prior to being introduced into the reactor 12 or mixed with aromatics or other hydrocarbons to reduce the viscosity. In particular applications, the feed stream 14 may be heated to a temperature of from 25° C. to 500° C. to improve conversion efficiency or vaporize heavier liquid hydrocarbons either externally or within the reactor.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

An oxygen-containing gas feed 16 for combustion of a hydrogen-rich fuel gas feed 18 is also fed to the reactor 12 as a separate stream. The oxygen-gas feed 16 may be a concentrated oxygen-gas feed, wherein a majority of the feed (i.e., >50 mol %) is composed of oxygen gas ($O_2$). In many instances, the oxygen-containing gas will be a high-purity oxygen-containing gas feed composed of $O_2$ in an amount of from 20 mol % to 100 mol % of the oxygen gas feed stream. This may be that provided from an air separation unit (not shown) used for separating oxygen gas from air or other oxygen-gas source. Air may also be used as the oxygen-containing gas. In cases where air is used as the oxygen-containing gas, or cases where there are large amounts of impurities (e.g., $N_2$) in the oxygen-containing gas feed, separation of such impurities from the product may be necessary downstream.

A steam or water ($H_2O$) feed is also feed to the reactor 12 as separate steam feed stream 20. The cracking feed 14 and/or oxygen-gas feed 16 may also be premixed with steam in certain embodiments. In some instances, the separate steam feed stream 20 may be eliminated where sufficient steam is provided and mixed with the feeds 14 and/or 16.

Cracked reaction products 22 are removed from the reactor 12 where they may be cooled by quenching in a quenching unit 24, such as a water-droplet-spray quench vessel, or other suitable gas quench devices. The cracked products 22 will typically be a mixture of hydrogen gas, steam, oxygenates, some heavies (>C4), some aromatics, and product olefins.

The quenched cracked reaction products 26 may be delivered to a separation unit 28, where the product gases are separated to form a product stream 30 containing product olefins, such as ethylene ($C_2H_4$), propylene ($C_3H_6$), and others, and a separated gas stream 32, as well as a feedstock recycle stream 35 also returned unconverted hydrocarbon feedstock back to mix with fresh cracking feed 14 to go through the reactor 12 again.

The separated gas stream 32 is removed from the separator 28 and will typically contain hydrogen gas ($H_2$), with minor amounts of methane ($CH_4$), and carbon oxides of CO and $CO_2$. Because dehydrogenation occurs during the cracking reaction, enough hydrogen is typically generated so that it can be used as a fuel gas for generating heat for the cracking reaction in reactor 12. Thus, the gas stream 32 may be recycled and fed as the hydrogen-rich fuel feed 18. In some cases, enough hydrogen gas is generated during the cracking reaction so that no additional fuel is needed in addition to that supplied by the recycle stream 32. In other cases, however, additional fuel feed 34 of a hydrogen-rich feed may be used for the fuel feed 18, such as an initial fuel feed during reactor startup, or that is combined with the recycle stream 32 to form the fuel feed 18 when an insufficient amount of hydrogen is available in the recycle stream 32 for combustion reaction heat.

Based upon the type of cracking feed, the operational conditions of the reactor 12 may vary. In a typical cracking reaction using the ANJEVOC-C reactor, the oxygen feed 16 is typically used with excess hydrogen or fuel gas so that all the oxygen is consumed. Usually, the amount of hydrogen will be 2 to 4 times the stoichiometric amount needed for combustion with oxygen. The oxygen feed 16 may provide an oxygen equivalent-to-fuel mole ratio of from 0.25 to 0.50. Furthermore, the ratio between the crack feed to hydrogen fuel will typically range from 1.0 to 10 based on mass depending on the hydrocarbon feed. The residence time within the reactor 12 may range from 20 milliseconds or less. As will be discussed in more detail later on, recirculation zone temperature within the reactor will typically range from 1000° C. to 1300° C.

It should be noted that while the system 10 of FIG. 1 shows single units for the various process steps, each unit could be composed of one or more units that may operate in conjunction with one another, such as parallel or sequentially, to carry out the various process steps described.

Figure 2:
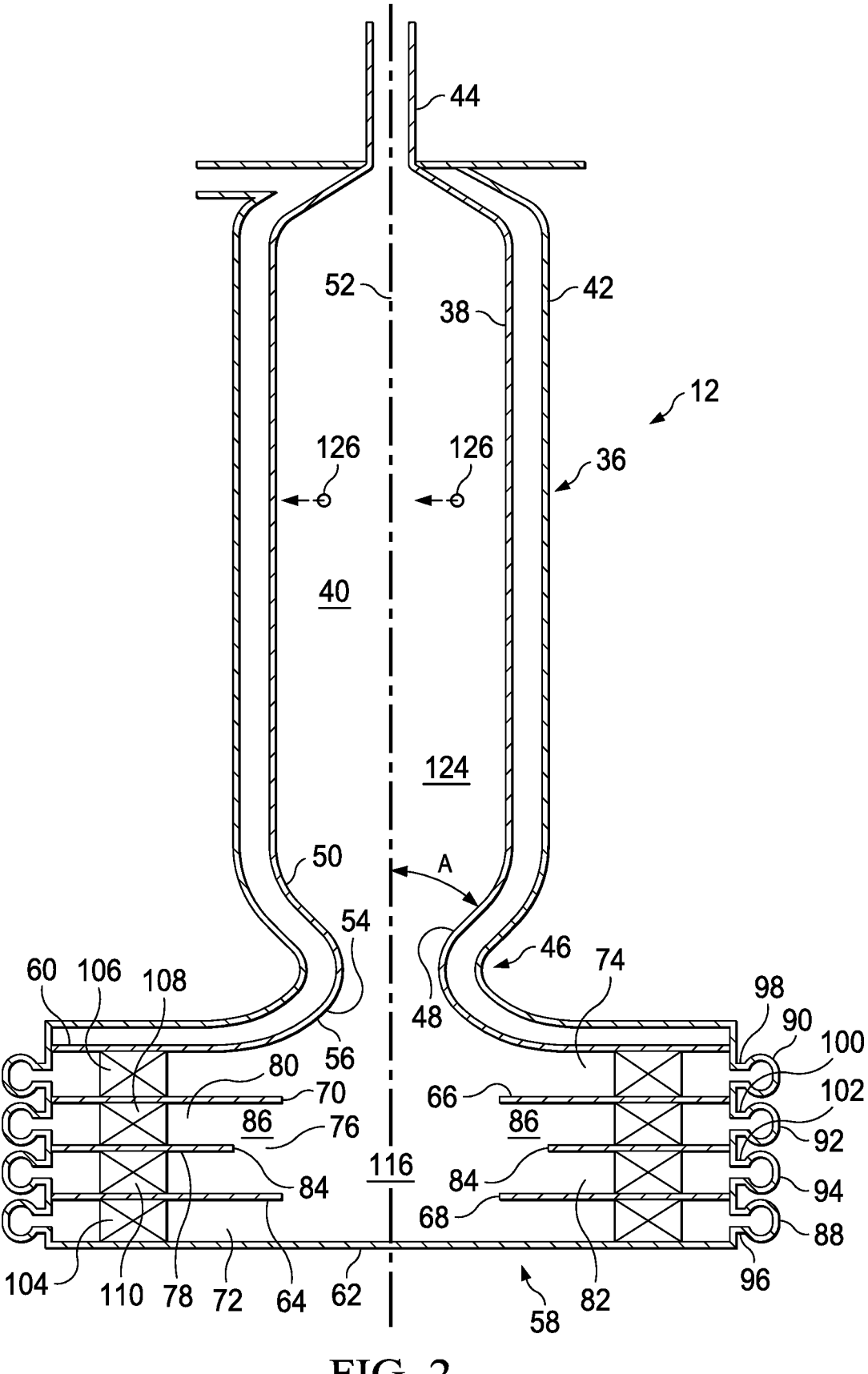
FIG. 2 is a schematic representation of a prior art reactor system for cracking shown in cross section.

Referring to FIG. 2, an elevational cross-sectional schematic representation of the cracking reactor system 12 for cracking of hydrocarbons, such as ethane, propane, liquefied petroleum gas (LPG), butane, naphtha, natural gas, light gas oils, natural gas liquids (NGL), heavy gas oils, or a combination of these hydrocarbons, is shown. The reactor 12 constitutes an ANJEVOC-C reactor and includes a reactor vessel 36 having a reactor wall 38 that defines an interior reaction chamber 40. The reactor wall 38 may have a cylindrical configuration with a constant diameter along all or a portion of its length, which may constitute a majority of its length. In most instances, the reactor 12 is oriented vertically so that the cylindrical reactor wall 38 is oriented in an upright orientation. The reactor can have other orientations (e.g., horizontal, sloped), however, because the process is controlled by the centrifugal force, which exceeds the gravitational force by several orders of magnitude. The reactor vessel 36 may be configured to provide a length to diameter ratio (L/D) of at least 2. In particular applications, the L/D ratio may range from 2-10.

The reactor vessel 36 may be formed from steel. In certain embodiments, a cooling jacket can be provided around the reactor vessel, wherein a second steel wall 42 is positioned around and spaced from the inner reactor wall 38 and a cooling fluid, such as water may be circulated through the jacket formed between the walls 38, 42. In other embodiments, the reactor wall 38 may be formed from one or more layers of refractory material that line the interior of an outer steel wall to reduce heat loss and sustain the high temperatures of the reactor 12. As will be described later on, because of the unique design and operation of the reactor 12, the reactor wall 38 is cooled internally by the high-velocity near-wall gas flow pushed by centrifugal forces against the reactor wall 38 so that in some applications no exterior cooling jacket is required. This also allows refractory materials to be used for the interior of the reactor wall 38. Refractory materials (without cooling) typically cannot be used with conventional cracking reactors with pure oxygen due to the higher temperatures (~2800° C.) encountered.

An outlet 44 is provided at the upper or downstream end of the reactor vessel 36 for removing or discharging cracked products from the reaction chamber 40. Although the outlet 44 is shown located at the upper end of the reactor vessel 36, in other embodiments it may be located at the lower end of the reactor vessel 36, so that the flow through the reactor is in the opposite direction (i.e., from top to bottom). The outlet diameter can be same as the diameter of the reactor wall 38 or the outlet diameter may be reduced to accelerate the flow before quenching and collection downstream.

The reactor 12 includes a reactor inlet assembly 46 that is coupled or joined to the lower or upstream end of the reactor wall 38 of the reactor vessel 36. The inlet assembly 46 has a diverging conduit 48 with a circumferential wall 50 that surrounds a central longitudinal axis 52 of the reactor. Where the reactor 12 is oriented vertically, the central axis 52 will also be oriented vertically as well and will be concentric with or parallel to a central vertical axis of the reactor vessel 36. In the embodiment shown, the axis 52 is concentric with and aligned with the central longitudinal axis of the reactor vessel 36. The circumferential wall 50 extends from opposite upstream and downstream ends of the diverging conduit 48. As used herein, the terms "upstream" and "downstream" or similar expressions with respect to describing various components of the reactor system 12 shall refer to the position of the component with respect to the direction of overall fluid flow through the reactor 12 along the central axis 52. A converging conduit 54 having an upstream and downstream end, with the central longitudinal axis 52 passing through the converging conduit 54, is connected to the upstream end of the diverging conduit 48, and the upstream end of the feed or reactor inlet assembly 46 to form a venturi. As can be seen in FIG. 2, the circumferential wall 50 smoothly expands in width or diameter from the upstream end to the downstream end of the diverging conduit 48. The interior of the circumferential wall 50 may have a circular radial transverse cross section (with respect to the axis 52) along its length. The circumferential wall 50 defines an interior flow path of the inlet assembly 46.

The diverging conduit 48, as well as the other diverging conduits described herein, is configured for non-supersonic fluid flow. Conduits or nozzles configured for supersonic flow, such as de Laval nozzles, are configured differently from the conduit 48 to provide supersonic flow downstream to form a shockwave. The diverging conduit 48 does not form such supersonic flow or shockwave. Instead, the conduit 48 has a geometry that facilitates a recirculation and backflow of gases within the interior reaction chamber 40 near the central longitudinal axis 52 in combination with annular swirling jet gas flow adjacent to the inner reactor wall 38. As such, the diverging conduit 48 will have a greater angle of divergence than the angle of divergence typically utilized in de Laval nozzles (e.g., 15° or less). In, certain embodiments, the overall angle of divergence "A" (FIG. 2) relative to the axis 52 may be from 25° or more. In particular instances, the angle of divergence A for the diverging conduits discussed herein is from 25° to 55°. In some embodiments, the angle of divergence A is of from at least, equal to, and/or between any two of 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, and 55°. The large divergence angle does not lead to recirculation of the flow at the walls as in this unique design the upstream swirling flow is coupled with the convergent divergent nozzle.

The downstream end of the diverging conduit 48 joins the reactor wall 38 around its perimeter so that the diverging conduit 48 is in fluid communication with the reactor chamber 40 of the cracking reactor vessel 36. The upstream end of the diverging conduit 48 or converging conduit 54 forms a reactor inlet 56 of the reactor vessel 36.

A reactor feed assembly 58 is provided with the reactor 12. The reactor feed assembly 58 is in fluid communication with the reactor inlet 56 of the inlet assembly 46, with the central axis 52 passing through the reactor feed assembly 58. The feed assembly 58 includes a downstream feed assembly wall 60 that extends circumferentially around and joins the upstream end of the reactor inlet 56. The feed assembly wall 60 is oriented perpendicularly or substantially perpendicularly (i.e., ≤5 degrees from perpendicular about its circumference) to the central axis 52.

Axially spaced upstream from the downstream wall 60 along the central axis 52 is an upstream feed assembly wall 62. The upstream wall 62 is perpendicular to or substantially perpendicularly (i.e., ≤5 degrees from perpendicular about its circumference as it extends from the central axis) to the central axis 52 and extends across the central axis 52.

An upstream gas partition wall 64 and a downstream gas partition wall 66 are axially spaced between the downstream and upstream feed assembly walls 60, 62 and are axially spaced from one another, with the upstream wall 64 being positioned upstream from the downstream partition wall 66. The partition walls 64, 66 are also each oriented perpendicularly to or substantially perpendicularly (i.e., ≤5 degrees from perpendicular about its circumference as it extends from the central axis) to the central axis 52, with each having a central opening 68, 70, respectively, that surrounds the central axis 52 and is concentric with the diverging conduit 48. The central openings 68, 70 each have a circular configuration. Other shapes for the central openings 68, 70 (e.g., oval) may also be used provided such configuration facilitates the swirling of gases to provide the required flow patterns described herein. This shape may also correspond to the cross-sectional shape of the circumferential wall 50 of the diverging conduit 48. In most applications, however, the central openings 68, 70 will be circular in shape. The central openings 68, 70 may have a diameter or width that is the same or slightly different (i.e., greater or smaller) than the diameter or width of the diverging conduit 48 at its narrowest point.

The upstream partition wall 64 defines an annular gas flow space 72 located between the upstream feed assembly wall 62 and the upstream side of the upstream partition wall

64. The flow space 72 constitutes an upstream annular hydrocarbon cracking feed inlet flow space. Likewise, an annular gas flow space 74 is defined by the downstream side of the downstream partition wall 66 and the downstream feed assembly wall 60. The flow space 74 constitutes an annular steam or water inlet flow space.

A further annular flow space 76 is defined between the upstream side of the downstream gas partition wall 66 and the downstream side of the upstream gas partition wall 64. The flow space 76 constitutes an annular fuel gas inlet flow space. The annular fuel gas inlet flow space 76 is further partitioned by a fuel gas partition wall 78, the fuel gas partition wall 78 is axially spaced between the downstream gas partition wall 66 and the upstream gas partition wall 64 to define first and second annular fuel gas inlet flow spaces 80, 82. The fuel gas partition wall 78 has a central opening 84 that surrounds the central axis 52 of the diverging conduit 48, and wherein the periphery of the central opening 84 of the fuel gas partition wall 78 is spaced radially outward from the central openings 68, 70 a distance from the upstream gas partition wall 64 and the downstream gas partition wall 66, as is shown. The area spaced radially inward from the central opening 84 of the fuel gas partition wall 78 between the upstream and downstream gas partition walls 64, 66 defines an annular combustion zone 86. The size of the central opening 84 can vary to fit the perpendicular extent of combustion zone 86.

This configuration provides flow passages through which hydrocarbon gas feed to be cracked, steam, oxygen gas, and hydrogen-rich fuel for providing combustion heat can each be separately introduced and passed through the flow spaces 72, 74, 80, 82, respectively, to the central axis 52 of the diverging conduit 48. In most cases, the lowermost or upstream flow space 72 will constitute a hydrocarbon cracking feed inlet flow space. The steam feed is introduced into the uppermost or upstream annular steam inlet flow space 74. A fuel gas feed comprised of an oxygen-containing gas feed and a hydrogen-rich gas feed is introduced into the first and second annular fuel gas inlet flow spaces 80, 82. Typically, the downstream flow space 80 will be used for delivering the oxygen-containing gas and the upstream flow space 82 will be used for delivering the hydrogen-rich fuel gas. In other instances, these may be reversed.

The flow passages 72, 74, 80, 82 are configured so that the different feeds pass through flow spaces to the central axis 52 of the diverging conduit 48 in an inwardly swirling fluid flow pattern within said flow spaces so that the feeds flow about the central axis 52 of the diverging conduit 48. The fuel gas feed combusts primarily in the small combustion zone 86 between the upstream and downstream partition walls 64, 66 within the central opening 84 of the fuel gas partition wall 78.

The walls 60, 62, 64, 66, and 78 forming the different flow spaces 72, 74, 80, 82 are axially spaced apart to provide the desired volume and flow characteristics for the gases flowing through them. This may be based upon the desired flow rates or linear velocities of each of the feed gases and their relative amounts. For instance, the relative volume of oxygen gas needed for the combustion is typically smaller than that of the hydrogen-rich fuel gas needed for the combustion. Therefore, the partition wall 78 may be spaced closer to the downstream partition wall 66 so that the flow space 82 for the hydrogen fuel is larger to accommodate the greater flow of fuel gas. The particular spacing may depend on fuel gas mixture, the desired volume for combustion, and cracking feeds.

Annular gas manifolds 88, 90, 92, 94 may be provided around the outer periphery of the flow spaces 72, 74, 80, 82, respectively. The gas manifold 88 is fluidly coupled to a cracking feed source, such as cracking feed 14 of FIG. 1. The manifold 90 is fluidly coupled to a steam source, such as the steam feed 20 of FIG. 1. The manifold 92 is fluidly coupled to an oxygen-containing-gas source, such as the oxygen gas feed 16 of FIG. 1. And the manifold 92 is fluidly coupled to a hydrogen-rich or fuel feed source, such as the fuel feed 18 of FIG. 1. The manifolds 88, 90, 92, 94 are provided with the reactor feed assembly 58 to facilitate introduction of feed gases into the flow spaces 72, 74, 80, 82.

Gas inlets 96, 98, 100, 102 from the manifolds 88, 90, 92, 94, respectively, may be directed tangentially into the flow spaces 72, 74, 80, 82 so that the gases are not directed only radially toward the central axis 52 from the inlets 96, 98, 100, 102, but instead are directed mostly tangentially around the central axis 52 to provide an inwardly swirling flow pattern. Furthermore, the walls 60, 62, 64, 66, and 78 forming the different flow spaces of the feed assembly 58 keep the gases introduced from the manifolds 88, 90, 92, 94 from flowing axially along the central axis 52 while they are contained within the flow spaces 72, 74, 80, 82. The manifolds 88, 90, 92, 94 can be configured as standard manifolds (e.g., snail-like) as may be typically used in vortex devices.

Referring again to FIG. 2, the area extending from the central openings 68, 70 of the partition walls 62, 70, respectively, to the reactor inlet 56 define a mixing chamber 116. It is here that heated combustion gases from the fuel gas inlet flow space 76, hydrocarbon cracking feed from the upstream hydrocarbon feed inlet flow space 72, and steam from flow space 74 are discharged into the mixing chamber 116 so that hydrocarbon cracking feed, steam and heated combustion gases are mixed together and form a swirling gas mixture within the mixing chamber 116. This swirling gas mixture then passes through the diverging conduit 48 and into the reaction chamber 40 of the reactor vessel 36.

Because the oxygen-containing gas and hydrogen-rich fuel gas are introduced separately from one another into the flow spaces 80, 82, respectively, and not as mixture, this eliminates safety issues that would otherwise occur if these gases were premixed prior to their introduction into the feed assembly 58. Furthermore, the combustion reaction takes place very rapidly wherein most of the combustion occurs within a very small space within the combustion zone 86 where the two streams of oxygen-containing gas and hydrogen-rich fuel gas from the flow spaces 80, 82 are mixed immediately adjacent to the central opening 84 and prior to entering the mixing chamber 116.

The reaction temperature within the reaction chamber 40 and recirculation zone 124 may range from 900° C. to 1300° C. In particular embodiments, the temperature within the reactor and recirculation zone 124 may range from 600° C. to 1300° C., more particularly from 900° C. to 1250° C. In some embodiments, the reactor temperature is higher than what is achieved in conventional cracking reactors, such as tube furnace reactors, which typically operate at 800° C. to 900° C. As discussed earlier, this is due to the temperature limitations of the metallic materials used for such conventional reactors. In the present case, the swirling gas mixture facilitates keeping the walls of the reactor much cooler than in such conventional reactors. The use of such higher temperatures also allow a shorter residence or contact times shorter contact times resulting in better selectivity and conversion without formation of unwanted products. Operating temperatures for the reactor may be selected to avoid excess production of such unwanted compounds, such as acetylene.

The gases are introduced and flow through the flow spaces 72, 74, 80, 82 so that the axial velocity (i.e., relative to the axis 52) is controlled in being discharged into the mixing chamber 116. The reactor inlet assembly may further comprise guide vanes 104, 106, 108, 110, the guide vanes helping to provide selected azimuthal-to-radial velocity ratios of feed streams flowing into the mixing chamber. Further, the guide vanes may be movable to selected positions. The inlets 96, 98, 100, 102 and/or the orientation of the guide vanes 104, 106, 108, 110 may be set for each flow space 72, 74, 80, 82 so that a selected azimuthal-to-radial velocity for each of the feed streams that flow through the flow spaces 72, 74, 80, 82 is achieved. With respect to the azimuthal-to-radial velocity, in particular embodiments, this may range from 0 to 30 or more, more particularly from 0, 1, or 2 to 3, 4, 5, 6, 7, 8, 9, 10, 11, 12, 13, 14, 15, 16, 17, 18, 19, 20, 21, 22, 23, 24, 25, 26, 27, 28, 29, or 30. In some applications the azimuthal-to-radial velocity may range from 0 to 20, more particularly from 3 to 10. The particular azimuthal-to-radial ratio may vary depending upon the particular reactor configuration and composition of the various streams, however. This is more intimately related to the mixing times and reaction times depending on the flow rates, composition of the fuel and feedstocks used for cracking.

Cracked hydrocarbon products produced in the reactor are removed from the reactor vessel 36 through outlet 44, where they may be quenched and further processed and recycled, as discussed with respect to the process steps previously described for FIG. 1.

Figure 3:
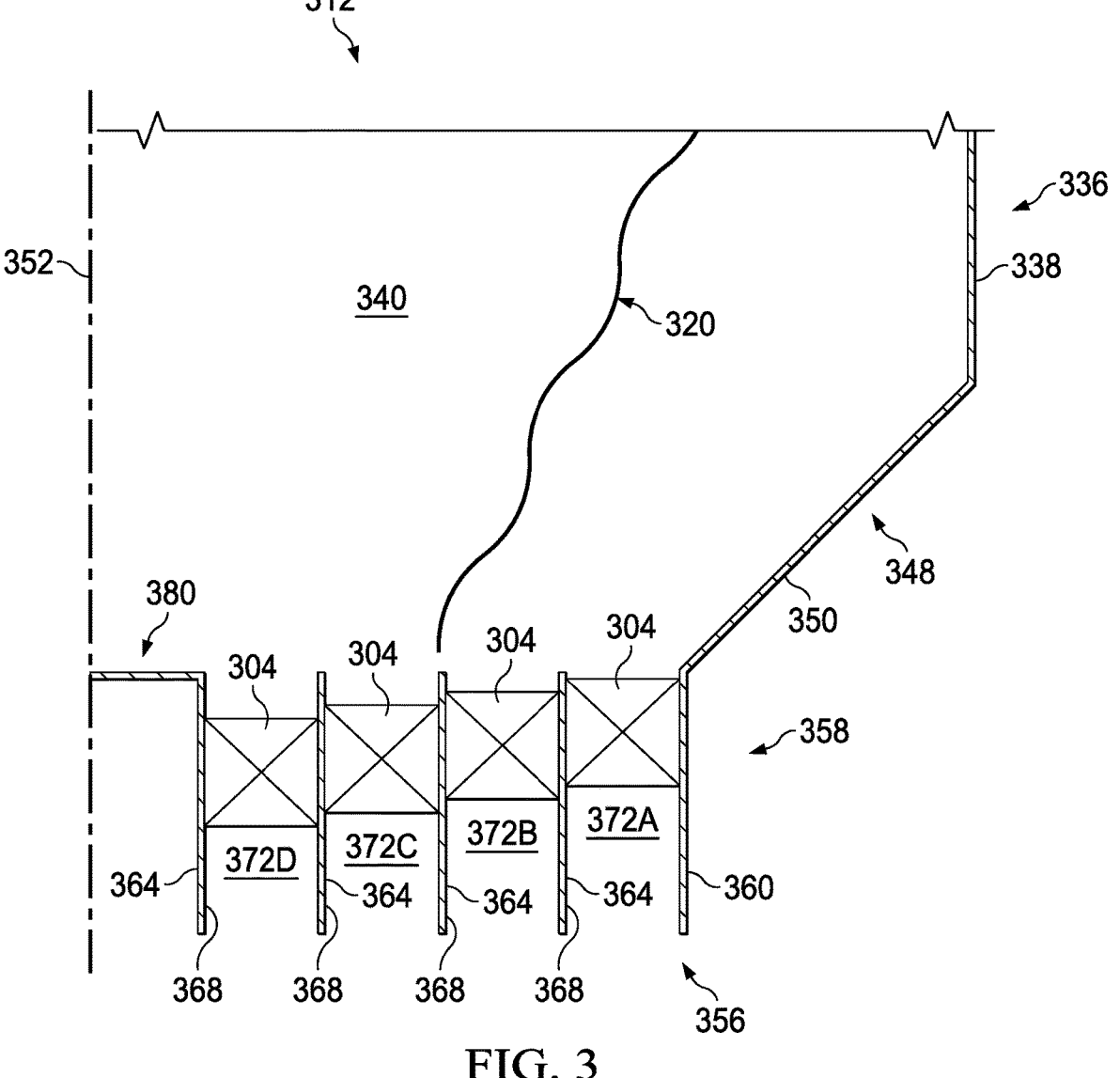
FIG. 3 is partial schematic representation of an improved lower or upstream portion of the reactor system showing a reactor feed assembly and portion of the reactor, constructed in accordance with particular embodiments of the disclosure.

Referring now to FIG. 3, an elevational cross-sectional schematic representation of a lower portion of one embodiment of an inventive cracking reactor system 312 for cracking of hydrocarbons, such as ethane, propane, LPG, butane, naphtha, natural gas, light gas oils, NGL, heavy gas oils, or a combination of these hydrocarbons, is shown. The reactor 312 constitutes an ANJEVOC-C reactor and includes a reactor vessel 336 having a reactor wall 338 that defines an interior reaction chamber 340. The reactor wall 338 may have a cylindrical configuration with a constant diameter along all or a portion of its length, which may constitute a majority of its length. In most instances, the reactor 312 is oriented vertically so that the cylindrical reactor wall 338 is oriented in an upright orientation. The reactor can have other orientations (e.g., horizontal, sloped), however, because the process is controlled by the centrifugal force, which exceeds the gravitational force by several orders of magnitude. The reactor vessel 336 may be configured to provide a length to diameter ratio (L/D) of at least 2. In particular applications, the L/D ratio may range from 2-10.

The reactor vessel 336 may be formed from steel. In certain embodiments, a cooling jacket (not shown) can be provided around the reactor vessel as taught in the prior art. In other embodiments, the reactor wall 338 may be formed from one or more layers of refractory material that line the interior of an outer steel wall to reduce heat loss and sustain the high temperatures of the reactor 312. Or as described elsewhere in this application, because of the unique design and operation of the reactor 312, the reactor wall 338 may be cooled internally by the high-velocity near-wall gas flow pushed by centrifugal forces against the reactor wall 338 so that in some applications no exterior cooling jacket is required. This also allows refractory materials to be used for the interior of the reactor wall 338. Refractory materials (without cooling) typically cannot be used with conventional cracking reactors with pure oxygen due to the higher temperatures (~2800° C.) encountered.

An outlet (not shown) is provided at the upper or downstream end of the reactor vessel 336 for removing or discharging cracked products from the reaction chamber 340, as known in the prior art. The outlet may be located at the upper end of the reactor vessel 336, or in other embodiments it may be located at the lower end of the reactor vessel 336, so that the flow through the reactor is in the opposite direction (i.e., from top to bottom). The outlet diameter can be the same as the diameter of the reactor wall 338 or the outlet diameter may be reduced to accelerate the flow before quenching and collection downstream.

The reactor 312 includes a diverging conduit 348 that is coupled or joined to the lower or upstream end of the reactor wall 338 of the reactor vessel 336. The diverging conduit 348 has a circumferential wall 350 that surrounds a central longitudinal axis 352 of the reactor. In some embodiments, the wall 350 may be a straight wall; in some other embodiments, the wall 350 may be a divergent curved wall similar to 54 and 55 in FIG. 2. Where the reactor 312 is oriented vertically, the central axis 352 will also be oriented vertically as well and will be concentric with or parallel to a central vertical axis of the reactor vessel 336. In the embodiment shown, the central axis 352 is concentric with and aligned with the central longitudinal axis of the reactor vessel 336. The circumferential wall 350 extends from opposite upstream and downstream ends of the diverging conduit 348. As used herein, the terms "upstream" and "downstream" or similar expressions with respect to describing various components of the reactor system 312 shall refer to the position of the component with respect to the direction of overall fluid flow through the reactor 312 along the central axis 352.

As can be seen in FIG. 3, the circumferential wall 350 smoothly expands in width or diameter from the upstream end to the downstream end. The interior of the circumferential wall 350 may have a circular radial transverse cross section (with respect to the axis 352) along its length. The circumferential wall 350 defines an interior flow path of the diverging conduit 348. While the diverging conduit 348 is shown in FIG. 3 as a linearly expanding form, it may take other shapes and rates of change of diameter. The overall angle of divergence of the conduit 348 or wall 350 may be the same as that described for reactor 12 of FIG. 2. The downstream end of the diverging conduit 348 joins the reactor wall 338 around its perimeter so that the diverging conduit 348 is in fluid communication with the reactor chamber 340 of the cracking reactor vessel 336.

The upstream end of the diverging conduit 348 is connected to a reactor feed assembly 358 of the reactor vessel 336. The feed assembly 358 includes an outer feed assembly wall 360 that extends circumferentially around and joins the upstream end of a reactor inlet 356. The feed assembly wall 360 is oriented parallel or substantially parallel (i.e., ≤5 degrees from axial about its circumference) to the central axis 352. While only a portion of the reactor 312 is shown, the feed assembly 358 extends concentrically about the entire circumference of the upstream end of the diverging conduit 348.

A number of gas partition walls 364 are provided along the length of the feed assembly 358. The partition walls 364 are each oriented parallel or substantially parallel (i.e., ≤5 degrees from axial with regard to the central axis) to the central axis 352, with each having an annular opening 368 that is aligned with the diverging conduit 348 and that circumscribes the central axis 352. The openings 368 each preferably have a circular or ring-shaped configuration. Other shapes for the annular openings 368 (e.g., oval) may also be used provided such configuration facilitates the swirling of gases to provide the required flow patterns described herein. This shape may also correspond to the cross-sectional shape of the circumferential wall 350 of the diverging conduit 348. In most applications, however, the openings 368 will be circular or ring shaped.

The partition walls 364 defines a series of annular gas flow spaces 372A, 372B, 372C, and 372D. The flow spaces 372A, 372B, 372C, and 372D constitute a group of feed inlet flow spaces. These feed inlet flow spaces are used to input various feeds into the reactor. While shown here with four inlets, there can be in fact any number of flow inlet, based on the number of partition walls 364.

Finally, each flow space 372 further comprises a guide vane 304. Each guide vane 304 can control the direction of how the feed goes into the reactor, preferably to create a swirling effect, as discussed further infra.

Inward of the innermost flow space 372D is a bluff body wall 380. The bluff body wall 380 is perpendicular to, and centered on, the central axis 352. The radius of the bluff body wall can vary based on the application and flow analysis.

The arrangement of which feed goes through which feed inlet flow space 372 can control the relative location within the reaction chamber 340 of the flame front 320 and the hottest gases, relative to the central axis 352 and the reactor wall 338. Feeds could be, for instance, hydrocarbons for cracking, steam, an oxygen-rich feed stream (e.g., oxygen or more steam), and a hydrocarbon- or hydrogen-rich feed stream (e.g., methane or hydrogen). In one preferred embodiment, the outermost (i.e., furthest from the central axis) flow space 372A would transport steam, the next one 372B the oxygen-rich feed stream, the next one 372C the hydrocarbon- or hydrogen-rich feed stream, and finally the innermost 372D with the hydrocarbon feedstock to be cracked. Such a configuration, with appropriate flow rates, would create a flame front 320 inside the reactor 336, with hot combustion gases closer to the reactor wall 338 and relatively colder feedstock closer to the central axis 352. In another preferred embodiment, the four feeds could be reversed, with the hydrocarbon cracking feed outermost, followed by the hydrogen-rich feed stream, then the oxygen-rich feed stream, then the steam, with the steam being closest to the central axis 352. This would cause the hot combustion gases to be in the core of the reactor 336, around the central axis 352, while the colder feedstock gases would be next to the reactor wall 338. Thereby, less heat resistant materials would be needed for the reactor wall 338, lowering the expense of building the reactor 336.

The flow passages 372 are configured so that the different feeds pass through flow spaces to the central axis 352 of the diverging conduit 348 in an inwardly swirling fluid flow pattern within said flow spaces so that the feeds flow about the central axis 352 of the diverging conduit 348.

The walls 364 forming the different flow spaces 372 are arranged to provide the desired volume and flow characteristics for the gases flowing through them. This may be based upon the desired flow rates or linear velocities of each of the feed gases and their relative amounts. For instance, the relative volume of oxygen gas needed for the combustion is typically smaller than that of the hydrogen-rich fuel gas needed for the combustion. The particular spacing may depend on fuel gas mixture, the desired volume for combustion, and cracking feeds.

Referring to FIG. 3, in operation, a cracking feed is introduced into one of the flow spaces 372, for example, the outermost flow space 372A. The cracking feed may be ethane, LPG, butane, naphtha, natural gas, light gas oils, NGL, heavy gas oils, or their combinations. While these cracking feed materials are typically introduced as gases, in some instances they may be introduced as liquids. Once introduced as liquids they are rapidly vaporized within the reactor. This may be beneficial in that light and heavy gas oils, for example, are typically vaporized outside the reactor in conventional cracking systems. Such exterior vaporization creates coking issues, however. By injecting them directly into the reactor in liquid form, these issues are avoided. The cracking feed will typically be denser than the combustion products. This is a result of both the high molecular weight of the cracking feed and its density at the selected temperature of the cracking feed. The denser gas/liquids move outward while the lighter combustion products move inward due to very high centrifugal acceleration (100,000-1M g forces). The denser hydrocarbons rapidly mix into the peripheral combustion products at very high temperature due to high swirl.

A hydrogen-containing fuel gas is introduced into the next inward annular gas flow space 372B. The hydrogen- or hydrocarbon-containing fuel gas may be hydrogen gas ($H_2$) and/or methane ($CH_4$). In certain embodiments where a combination of hydrogen gas and methane are used, the methane may be present in the fuel gas in an amount of from 20 mol %, 15 mol %, 10 mol %, 5 mol % or less. Greater amounts of methane may impact the desired selectivity. In other embodiments, however, greater amounts of methane may be used, including 100% methane for the fuel gas. Natural gas may also be used as the fuel gas.

The hydrogen-containing fuel gas may be a hydrogen-gas-rich stream composed primarily of hydrogen gas, which may be a recycled stream such as the recycle stream 32 (FIG. 1) or additional hydrogen gas, such as the stream 34. The hydrogen-gas-rich stream may contain other components such as methane, CO, steam, and $CO_2$. Other hydrocarbons can also be used as the fuel gas in certain embodiments and applications. Additionally, small amounts of $N_2$ can also be present. Sulfur can also be present in the fuel gas or other feed streams. If sulfur is present, additional separation downstream may be required. The reactor and process are sufficiently robust to accommodate the presence of sulfur, particularly since no catalyst is used. The ratio between the crack feed to hydrogen-containing fuel will typically range from 1 to 10 based on mass.

An oxygen-containing gas, which may be a concentrated or pure oxygen gas, such as from an air separation unit (not shown), is introduced as the oxygen feed through the next inward annular flow space 372C. In certain applications, the mole ratio of $H_2/O_2$ may range from 2 to 5, more particularly from 2 to 4. The oxygen feed may provide an oxygen equivalent-to-fuel mole ratio of from 0.2 to 1.0. An excess of hydrogen also helps to scavenge free radicals (e.g., H, $CH_3$, O, OOH, OH) formed that would otherwise react with the cracking feed.

Finally, steam or water is introduced through the innermost of the flow spaces 372D. The introduced steam facilitates reducing the reaction temperatures within the reactor 312. Steam may also be pre-mixed with the various feeds, such as with the cracking gas feed and/or oxygen-containing feed. Steam may be used in a mass ratio of steam-to-fuel of from greater than 0 to 2.0 in certain applications.

Figure 4:
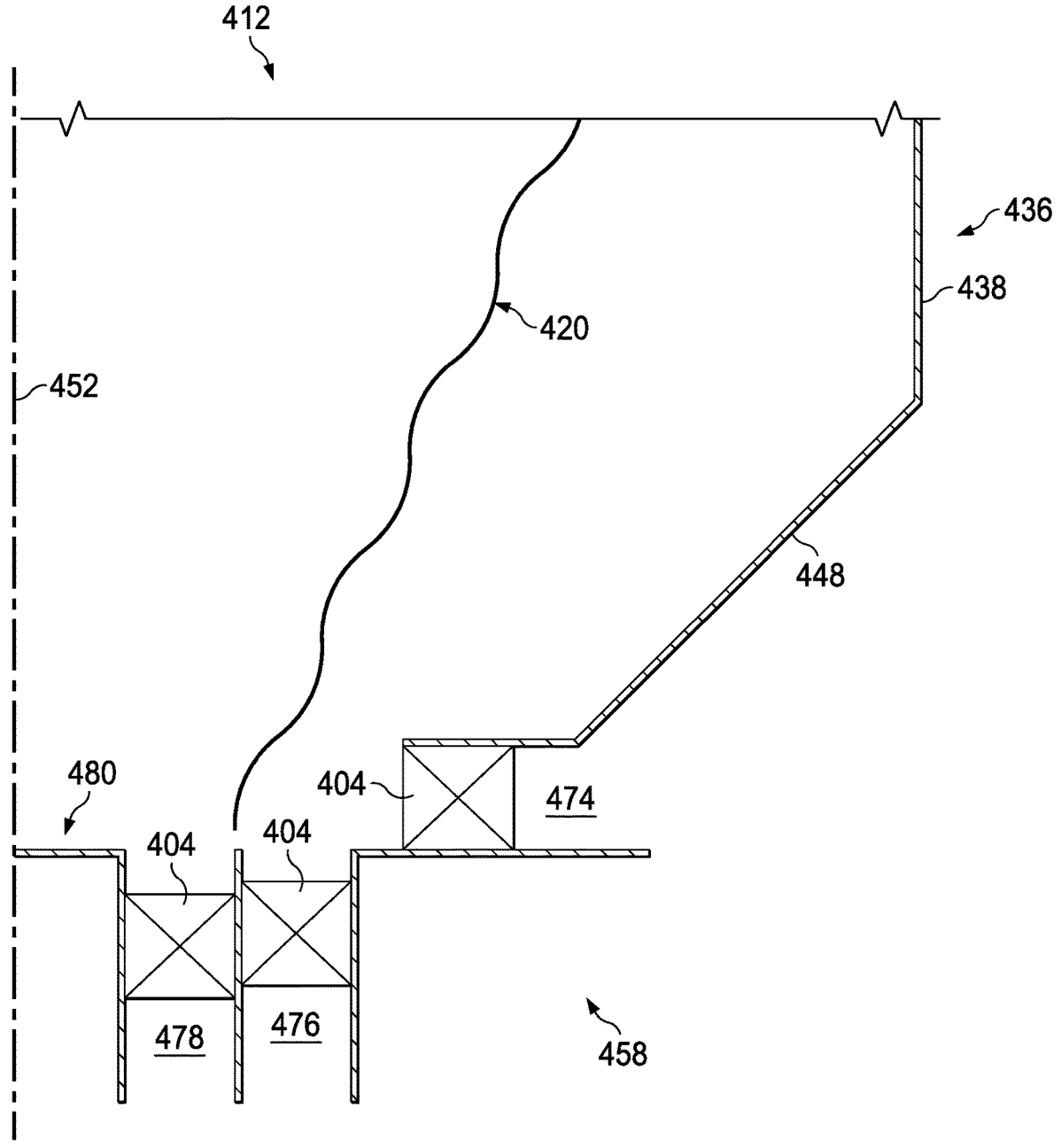
FIG. 4 is partial schematic representation of a lower or upstream portion of the reactor system showing a reactor feed assembly and portion of the reactor, constructed in accordance with particular embodiments of the disclosure.

Referring now to FIG. 4, another embodiment of the disclosure is disclosed. Similar to the embodiment in FIG. 3, the reactor 412 comprises a reactor vessel 436 having a reactor wall 438 coupled to a diverging conduit 448, which in turn is connected to a reactor feed assembly 458. The overall angle of divergence of the diverging conduit 448 may be the same as that previously described. In this instance, one flow space 474 enters the feed assembly 458 perpendicular to the central axis 452. The two remaining flow spaces 476 and 478 still flow into the feed assembly 458 parallel to the central axis. In such a configuration, the hydrocarbon feedstock would enter the feed assembly 458 from flow space 474, while the hydrogen-rich feed stream would enter via flow space 476, and the oxygen-rich feed stream and the steam would enter via flow space 478.

The feed assembly 458 would again include guide vanes 404, to further control the direction of flow into the feed assembly 458. And finally, inward of the innermost flow space 478 is a bluff body wall 480. The bluff body wall 480 is perpendicular to, and centered on, the central axis 452. The radius of the bluff body wall can vary based on the application and flow analysis. Note also that the flame front 420 would be affected by the selection of which feed enters the feed assembly 458 via from the various flow spaces.

Such an arrangement alters the mixing and swirling characteristics inside the reactor, thereby altering the reaction kinetics and thus the conversion, selectivity and yield coming out of the reactor 412. Determining improved and potentially optimal flow characteristics can be accomplished via experimental tests, or via modern sophisticated modeling tools as is known in the art.

Figure 5:
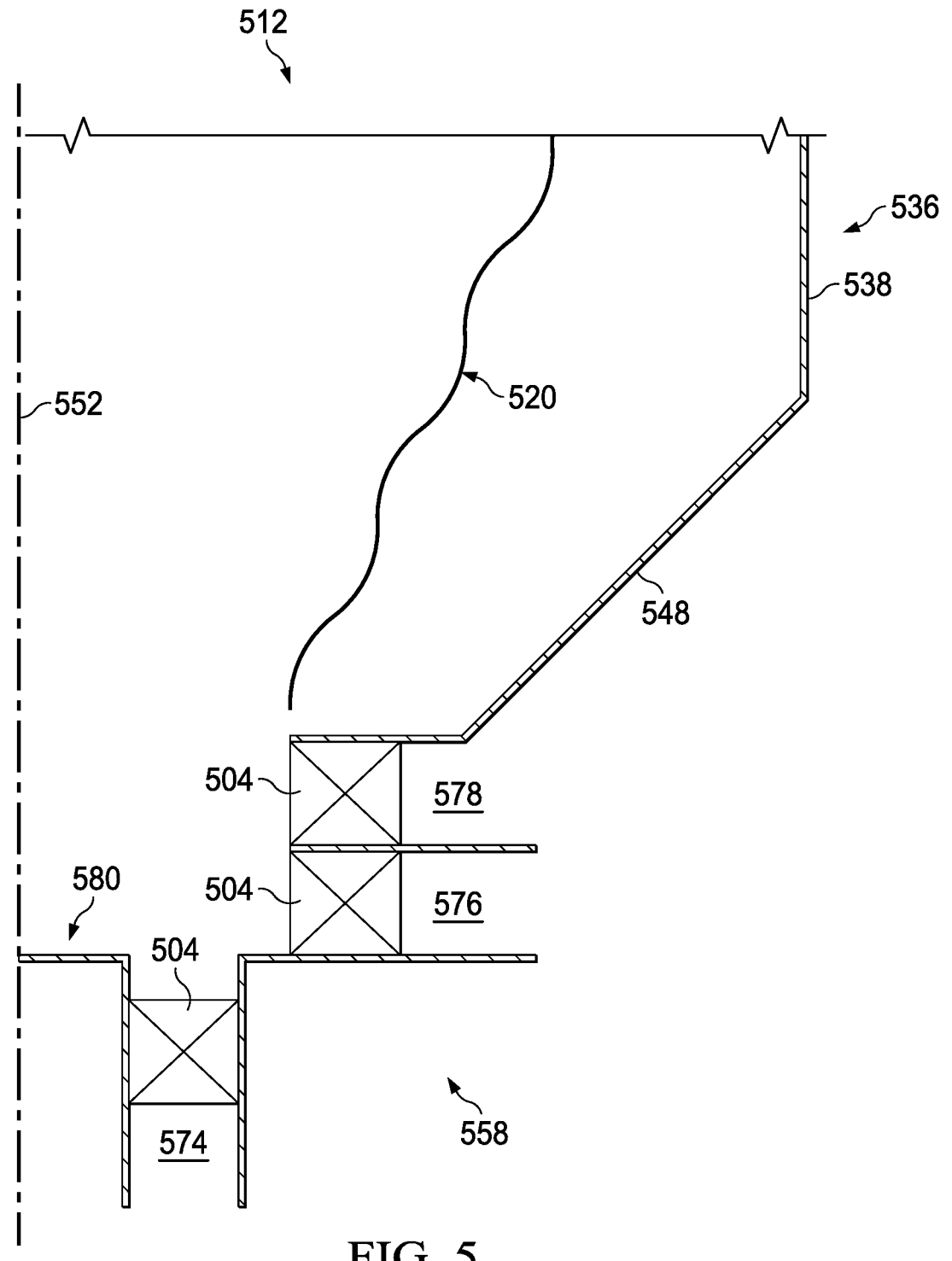
FIG. 5 is partial schematic representation of a lower or upstream portion of the reactor system showing a reactor feed assembly and portion of the reactor, constructed in accordance with particular embodiments of the disclosure.

Referring now to FIG. 5, another embodiment of the disclosure is disclosed. Similar to the embodiment in FIGS. 3 and 4, the reactor 512 comprises a reactor vessel 536 coupled to a diverging conduit 548, which in turn is connected to a reactor feed assembly 558. The overall angle of divergence of the diverging conduit 548 may be the same as that previously described. In this instance, one flow space 574 enters the feed assembly 558 parallel to the central axis 552. The two remaining flow spaces 576 and 578 still flow into the feed assembly 558 and are oriented perpendicular to the central axis. In such a configuration, the hydrocarbon feedstock would enter the feed assembly 558 from flow space 574, while the hydrogen-rich feed stream would enter via flow space 576, and the oxygen-rich feed stream and the steam would enter via flow space 578.

The feed assembly 558 would again include guide vanes 504, to further control the direction of flow into the feed assembly 558. And finally, inward of flow space 574 is a bluff body wall 580. The bluff body wall 580 is perpendicular to, and centered on, the central axis 552. The radius of the bluff body wall can vary based on the application and flow analysis.

Such an arrangement again alters the mixing and swirling characteristics inside the reactor, thereby altering the reaction kinetics and thus the conversion, selectivity and yield coming out of the reactor 512. Determining improved and potentially optimal flow characteristics can be accomplished via experimental tests, or via modern sophisticated modeling tools as is known in the art. Importantly, this illustrates the concept that improvements can be made in the performance of the reactor by varying the angle of the inlet flows of the various combustion components. Indeed, while the various flows are shown in these examples as being either axial, perpendicular, or some of each, any other angles would be acceptable. It should be noted that such a configuration would likely have the flame front starting from the edge of flow space 578.

Figure 6:
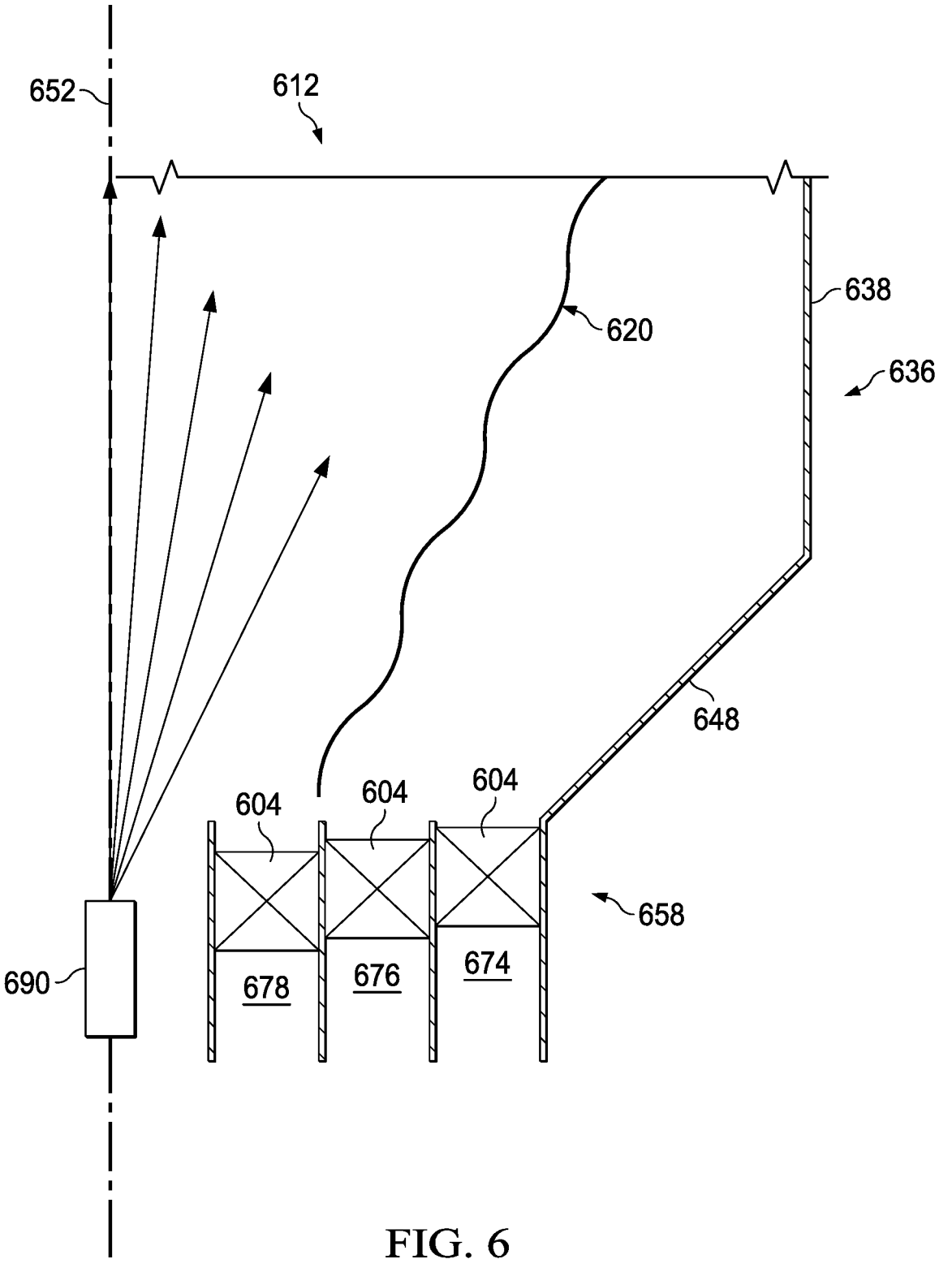
FIG. 6 is partial schematic representation of a lower or upstream portion of the reactor system showing a reactor feed assembly and portion of the reactor, constructed in accordance with particular embodiments of the disclosure.

Referring now to FIG. 6, another embodiment of the disclosure is disclosed. Similar to the embodiments in FIGS. 3-5, the reactor 612 comprises a reactor vessel 636 coupled to a diverging conduit 648, which in turn is connected to a reactor feed assembly 658. The overall angle of divergence of the diverging conduit 648 may be the same as that previously described. In this instance, three flow spaces 674, 676 and 678 of the feed assembly 658 are oriented parallel to the central axis 652. In addition, an atomizer 690 is positioned closer to the central axis 652, compared to the flow spaces 674, 676 and 678, and is oriented parallel with the central axis 652. The feed assembly 658 further comprises guide vanes 604, one for each flow space. The atomizer 690 is used to inject liquid hydrocarbon feedstocks, while flow spaces 674, 676 and 678 are used to inject the other feed streams, including an oxygen-rich feed stream, a hydrogen-rich feed stream, and steam.

Again, having the hydrocarbon feed stream most inward means that the outer walls of the reactor vessel 636 will be where the hot combustion gases will be during operation, while the core of the reactor vessel 636 will be cooler due to the hydrocarbon feed stream, entering via the atomizer. Other configurations may be utilized, based on desired reaction characteristics.

Again, such an arrangement again alters the mixing and swirling characteristics inside the reactor, thereby altering the reaction kinetics and thus the conversion, selectivity and yield coming out of the reactor 612, as well as the location of the flame front 620. Determining improved and potentially optimal flow characteristics can be accomplished via experimental tests, or via modern sophisticated modeling tools as is known in the art. Importantly, this illustrates the concept that improvements can be made in the performance of the reactor by varying the angle of the inlet flows of the various combustion components. Indeed, while the various flows are shown in these examples as being either axial, perpendicular, or some of each, any other angles would be acceptable.

Figure 7:
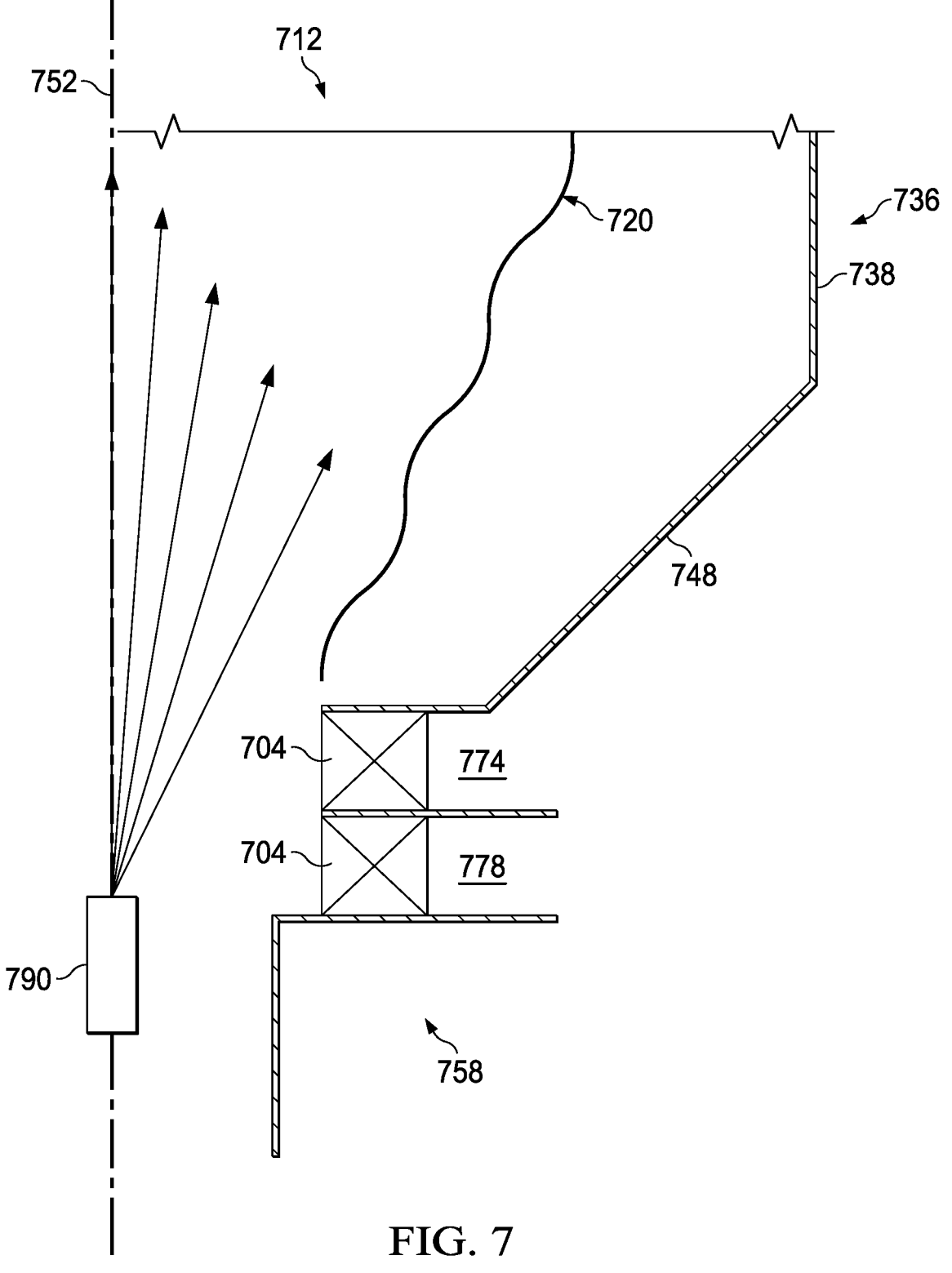
FIG. 7 is partial schematic representation of a lower or upstream portion of the reactor system showing a reactor feed assembly and portion of the reactor, constructed in accordance with particular embodiments of the disclosure.

Referring now to FIG. 7, another embodiment of the disclosure is disclosed. Similar to the embodiment in FIGS. 3-6, the reactor 712 comprises a reactor vessel 736 coupled to a diverging conduit 748, which in turn is connected to a reactor feed assembly 758. The overall angle of divergence of the diverging conduit 748 may be the same as that previously described. In this instance, two flow spaces 774 and 778 of the feed assembly 758 are oriented perpendicular to the central axis 752. In addition, an atomizer 790 is positioned closer to the central axis 752, compared to the flow spaces 774 and 778, and is oriented parallel with the central axis 752. The atomizer 790 is used to inject liquid hydrocarbon feedstocks, while flow spaces 774 and 778 are used to inject other feed streams, for instance, one of oxygen-rich with steam, and one that is a hydrogen-rich stream.

Again, having the hydrocarbon feed stream most inward means that the outer walls of the reactor vessel 636 will be where the hot combustion gases will be during operation, while the core of the reactor vessel 636 will be cooler due to the hydrocarbon feed stream, entering via the atomizer. And again, such an arrangement alters the mixing and swirling characteristics inside the reactor, thereby altering the reaction kinetics and thus the conversion, selectivity and yield coming out of the reactor 712. Determining improved and potentially optimal flow characteristics can be accomplished via experimental tests, or via modern sophisticated modeling tools as is known in the art. Importantly, this illustrates the concept that improvements can be made in the performance of the reactor by varying the angle of the inlet flows of the various combustion components. Indeed, while the various flows are shown in these examples as being either axial, perpendicular, or some of each, any other angles would be acceptable. It should be noted that such a configuration would likely have the flame front starting from the edge of flow space 774.

In each case, from FIG. 3 to FIG. 7, the volumetric flow rates are controlled to create a swirling pattern inside the reactor, thereby creating a superior reaction, with high yields and conversion. Optimal flow rates for all the various flow streams, along with actual compositional details, and shape of the reactor, are all modeled via software to optimize the results of the reaction. Of note, if one wants to keep the walls relatively cool, then one can use a design as shown in FIG. 4. If one prefers the coolest part of the reactor chamber to be towards the center, then one can use one of the other designs.

The reactor design described herein features high conversion of the cracking feed and higher selectivity for olefins than other conventional cracking methods. The reactor is relatively simple in configuration, which can significantly reduce the capital and operating costs. The high-swirling gas mixture provides stable and compact combustion using non-premixed fuel gases (i.e., $H_2+O_2$) that are combusted within a small combustion zone of the feed assembly. The reactor walls are cooled by the swirling steam flow against the wall allowing for higher temperatures in the reactor, requiring shorter residence times, so that more desirable products (e.g., ethylene) are produced. Maintaining lower reactor wall temperatures also allows refractory materials to be used in place of metal materials and thus minimizing heat loss.

Because the heated combustion gases are directly mixed with cracking feed in the swirling gas mixture, there is direct gas-gas heat transfer to carry out the cracking reactions. This differs from conventional cracking reactors, such as tube furnaces, which rely on non-direct heat transfer where heat is transferred through the tube walls of the reactor from a separate heating source, such as external combustion gases. Here the process is intensified in that the exothermic step of providing heat from the combustion of the fuel feed is immediately combined with the endothermic step of cracking the cracking feed. Thus, energy losses due to heat transfer through reactor walls and equipment, as with conventional systems, are eliminated or minimized. The reactor can be scaled up by increasing feeding rate and dimension scale up.

While the discussion above refers to the various fluids in generic terms, this is not to imply that absolutely pure components are required for the method and devices to work. Indeed, a certain amount of impurities can be tolerated without harming the overall process. For example, one may replace the oxygen with air or any other oxygen containing gas mixture. The following examples serve to further illustrate various embodiments and applications.

EXAMPLES

Example 1

CFD simulations with these configurations have been conducted to support the design concept. Following are results from the embodiment shown in FIG. 3, with the flow streams arranged in two different patterns: Design A (feedstock near central axis), in which the flow streams from centermost to outermost comprise hydrocarbon, hydrogen-rich fuel stream, oxygen-rich stream, and steam; and, Design B (feedstock near outer wall), in which the flow streams from outermost to centermost comprise hydrocarbon, hydrogen-rich fuel stream, oxygen-rich stream, and steam. These results are compared with the previous radial feeding design (shown in FIG. 2). Other designs perform similarly to the results shown here but may have different operational advantages. The operating conditions of the three configurations are shown in Table 1. The new axial-feeding design has zero steam dilution, leading to a higher hydrocarbon conversion but slightly lower selectivity to C2H4/C2H2.

TABLE 1

| Operating Conditions of the Axial-Feed ANJEVOC-C Reactor. | | | | |
|---|---|---|---|---|
| | C2H6 kg/hr | H2 kg/hr | O2 kg/hr | Steam for O2 Dilution kg/hr | Steam for Wall Cooling kg/hr |
| Previous Radial Feed Design | 72 | 12 | 38 | 38 | 18 |
| Axial Design A (Feedstock Near Axis) | 64.8 | 12 | 38 | 0 | 18 |
| Axial Design B (Feedstock New Wall) | 64.8 | 12 | 38 | 0 | 18 |

Table 1 shows the C2H4 mass fraction contour distribution in the previous radial-feeding design and the current axial-feed design B (feedstock near wall) reactors. The axial feeding design could improve the feedstock hydrocarbon conversion from ~68% to 91%, but with slightly lower C2H4 and C2H2 selectivity, and an overall higher C2H4 and C2H2 yield of ~61.5%.

Similarly, the axial-feed design with crack gas feeding near the axis shows slightly better performance as shown in Table 2 below.

TABLE 2

| Operating Conditions of the Axial-Feed ANJEVOC-C Reactor | | | |
|---|---|---|---|
| | | Axial Feeding | |
| | Radial Feeding Feedstock at bottom | Design A: Feedstock Near Axis | Design B: Feedstock Near Wall |
| C2H6 Conversion | 67.9% | 91.7% | 90.9% |
| C2H4 + C2H2 Selectivity | 83.8% | 69.1% | 67.7% |
| C2H4 + C2H2 Yield | 56.9% | 63.4% | 61.5% |

Table 2 shows a comparison of the main product gas compositions C2H4/C2H2/CO distribution between the previous radial-feeding design and the current axial-feeding design (Design B). In all cases, the axial-feed design produces higher product gas concentrations due to the higher hydrocarbon conversion (above 90%) than previous radial-feeding design.

While the disclosure has been shown in some of its forms, it should be apparent to those skilled in the art that it is not so limited, but is susceptible to various changes and modifications without departing from the scope of the disclosure based on experimental data or other optimizations considering the overall economics of the process. Accordingly, it is appropriate that the appended claims be construed broadly and in a manner consistent with the scope of the disclosure.

What is claimed is:

1. A reactor system for the conversion of hydrocarbons comprising:

a reactor vessel having a reactor wall that defines a reaction chamber;

a reactor inlet assembly having a diverging conduit with a circumferential wall that surrounds a central longitudinal axis and extends from opposite upstream and downstream ends of the diverging conduit, the circumferential wall expanding in width from the downstream to the upstream ends of the diverging conduit, the downstream end of the diverging conduit being in fluid communication with the reaction chamber of the reactor, the upstream end of the diverging conduit forming an inlet of the reactor inlet assembly;

a feed assembly in fluid communication with the inlet of the reactor inlet assembly, with the central axis passing through the feed assembly, the feed assembly comprising:

a downstream feed assembly wall that extends circumferentially around and joins the upstream end of the reactor inlet assembly;

an upstream feed assembly wall that is axially spaced upstream from the downstream feed assembly wall along the central axis, the downstream feed assembly wall and the upstream feed assembly wall together defining in part a mixing chamber for mixing two or more feed streams;

an upstream gas partition wall and a downstream gas partition wall that are each axially spaced between the downstream and upstream feed assembly walls and are axially spaced from one another, each upstream gas partition wall and downstream gas partition wall having a central opening that surrounds the central axis of the diverging conduit, an upstream annular hydrocarbon feed inlet flow space being defined between the upstream feed assembly wall and the upstream partition wall, an annular steam inlet flow space being defined between the downstream feed assembly wall and the downstream gas partition wall, and an annular fuel gas inlet flow space being defined between the downstream gas partition wall and the upstream gas partition wall; and wherein the annular fuel gas inlet flow space is further partitioned by a fuel gas partition wall, the fuel gas partition wall being axially spaced between the downstream gas partition wall and the upstream gas partition wall to define first and second annular fuel gas inlet flow spaces, the fuel gas partition wall having a central opening that surrounds the central axis of the diverging conduit, and wherein the periphery of the central opening of the fuel gas partition wall is spaced radially outward from the central openings of the upstream gas partition wall and the downstream gas partition wall, the area spaced radially inward from the central opening of the fuel gas partition wall between the upstream and downstream gas partition walls defining an annular combustion zone where heated combustion gases are formed; wherein said annular inlet flow spaces causing introduced feeds to flow in an inwardly swirling fluid flow pattern within said flow spaces about the central axis of the diverging conduit; and wherein the area extending from the central openings of the upstream and downstream partition walls to the inlet of the reactor inlet assembly define a mixing chamber of the feed assembly, with the heated combustion gases from the fuel gas inlet flow space and hydrocarbon feed from the upstream hydrocarbon feed inlet flow space being discharged into the mixing chamber so that hydrocarbon feed and heated combustion gases are mixed together and form a swirling gas mixture within the mixing chamber, the swirling gas mixture passing through the diverging conduit to the reaction chamber, and further wherein at least one of the inlet flow spaces causes its respective feed stream to enter the reactor in a direction that is not perpendicular to the central axis.

2. The reactor system of claim 1, wherein all the inlet flow spaces cause their respective feed streams to enter the reactor in a direction that is approximately parallel to the central longitudinal axis.

3. The reactor system of claim 2, wherein the reactor inlet assembly further comprises guide vanes, wherein the guide vanes provide selected azimuthal-to-radial velocity ratios of feed streams flowing into the mixing chamber, and further wherein the guide vanes may be movable to selected positions.

4. The reactor of claim 1, wherein one of the feed streams comprises steam.

5. The reactor of claim 1, wherein there are at least four feed streams, the streams comprising oxygen, methane, hydrogen, and one or more of C2, C4 or naphtha.

6. The reactor of claim 5, further comprising a feed stream of steam.

7. The reactor of claim 5, wherein the oxygen, methane and hydrogen flow in parallel to the central longitudinal axis, while the C2, C4 or naphtha flow in perpendicularly.

8. The reactor of claim 5, wherein the oxygen, methane and hydrogen flow in perpendicularly to the central longitudinal axis, while the C2, C3, C4, naphtha, or other higher hydrocarbon feeds flows in axially.

9. The reactor of claim 6, wherein all the feed streams flow into the reactor axially to the central longitudinal axis.

10. The reactor of claim 3, wherein the feed stream coming in via a swirl atomizer is naphtha, crude oil or NGL in liquid phase.

11. The reactor of claim 10, wherein the remaining feed streams not entering through the swirl atomizer are methane, hydrogen, oxygen, and water or steam.

12. The reactor of claim 10, wherein all the remaining feed streams enter the reactor parallel to the central longitudinal axis.

13. The reactor of claim 10, wherein all the remaining feed streams enter the reactor perpendicularly to the central longitudinal axis.

14. The reactor of claim 10, wherein one or more of the remaining feed streams enter the reactor axially to the central longitudinal axis, and one or more of the remaining inlet streams enter the reactor perpendicularly.

15. The reactor of claim 1, wherein the selection and placement of the one or more flow inlet spaces allows one to control the relative location of the flame front.

16. The reactor of claim 15, wherein the selection and placement of the one or more flow inlet spaces allows one to control the placement of the portions of the feed streams that comprise cold feedstock relative to the hot combustion gases existing in the reactor, with regard to the outer wall.

17. The reactor of claim 16, wherein the cold feedstock first enters the reactor closest to the outer wall, and then moves radially inward to interact with the hot combustion gases.

18. The reactor of claim 17, wherein the cold feedstock enters the reactor at or near the center of the reactor and moves radially outward to interact with the hot combustion gases.

19. The reactor of claim 15, wherein the one or more feed streams comprise methane, hydrogen, and oxygen.

20. The reactor of claim 19, wherein another of the one or more feed streams comprises water or steam.

* * * * *